THERMOCHEMICAL SCARFING DEVICES

Filed Aug. 17, 1950 7 Sheets-Sheet 1

INVENTORS
IVAN P. THOMPSON
WILLIAM ALLMANG
WILLIAM C. WEIDNER
BY
T. Donald Brooke
ATTORNEY INVENTORS
IVAN P. THOMPSOM
WILLIAM ALLMANG
WILLIAM C. WEIDNER
BY
F. Donald Brooks
ATTORNEY INVENTORS
IVAN P. THOMPSON
WILLIAM ALLMANG
WILLIAM C. WEIDNER
BY
T. Donald Brooks
ATTORNEY

THERMOCHEMICAL SCARFING DEVICES

Filed Aug. 17, 1950

INVENTORS
IVAN P. THOMPSON
WILLIAM ALLMANG
WILLIAM C. WEIDNER
BY
Donald Brooks
ATTORNEY INVENTORS
IVAN P. THOMPSON
WILLIAM ALLMANG
WILLIAM C. WEIDNER
BY
T. Donald Brooks
ATTORNEY INVENTORS
IVAN P. THOMPSON
WILLIAM ALLMANG
WILLIAM C. WEIDNER
BY
T. Donald Brooks
ATTORNEY INVENTORS
IVAN P. THOMPSON
WILLIAM ALLMANG
WILLIAM C. WEIDNER
BY
T. Donald Brooks
ATTORNEY

United States Patent Office 2,745,475

Patented May 15, 1956

2,745,475

THERMOCHEMICAL SCARFING DEVICES

Ivan P. Thompson, Elizabeth, William Allmang, Bloomfield, and William C. Weidner, Cranford, N. J., assignors, by mesne assignments, to Union Carbide and Carbon Corporation, a corporation of New York Application August 17, 1950, Serial No. 179,904

16 Claims. (Cl. 158—27.4)

This invention relates to thermochemical scarfing devices, and more particularly to post-mixed preheat-continuous slot desurfacers.

The main objects of this invention are to provide post-mixed desurfacing means having improved flashback resistance, simpler construction, greater compactness, more efficient utilization of gases, higher heat transfer to the work, increased stability, and faster starting than was possible in the past. Other objects will appear in the following description.

According to the present invention in apparatus for thermochemically scarfing metal bodies, a surface conditioning head is provided, comprising a nozzle block having a laterally continuous slot therein adapted to discharge a sheet-like stream of oxidizing gas in a zone extending transversely to the surface of a metal body. The slot is adapted to be disposed at an acute angle to the work surface of the metal body. The wall of the slot farther from the work surface extends smoothly and continuously forwardly and terminates in a front edge beyond the front edge of the wall of the slot nearer to the work surface for a distance measured along the slot and greater than the spacing between the walls. This construction brings the front edge of the farther wall close to the horizontal projection of the nearer wall. A plurality of fuel gas orifices are provided equidistant from said slot and in a line adjacent thereto. There is also provided preheat oxidizing gas orifice means separate from said fuel gas orifices and equidistant from said slot in a line adjacent to both said slot and said line of fuel gas orifices to discharge preheat oxidizing gas separate from the jets of fuel gas from said fuel gas orifices to form post-mixed preheat flames.

In the preferred form of the invention, a wide continuous slotted cutting oxygen nozzle is provided by an insert of heat resistant material fitted in a deep groove in a nozzle block. The front of the nozzle block above the groove extends forwardly of the part therebelow, and the insert has an overhanging upper lip. A row of interchangeable post-mixed preheat blocks is secured to the projecting upper front of the nozzle block above the groove, and these blocks depend into engagement with the upper lip of the cutting oxygen nozzle insert. A similar row of interchangeable preheat block is secured to the set back front of the nozzle block below the groove. This arrangement brings the leading preheat flames from the upper row of preheat blocks closer to the work and provides improved starting at greater cutting nozzle height and shallower angles.

The cutting oxygen slotted nozzle insert provides greater velocity at the sides than at the center thereof to improve the corner conditions when four sides of the work are desurfaced at the same pass. For this purpose the cutting nozzle insert has a row of longitudinally parallel bores, the bores near the lateral edge being of greater diameter than those nearer the center of the insert.

To economize and facilitate the manufacture and service of the post-mixed preheat blocks, each block is provided with a row of bores, with removable interchangeable cylindrical preheat inserts therein having separate longitudinal passages for the respective gases. Preferably each insert has a central axial bore for preheat oxidizing gas, and a peripheral groove connecting with longitudinal diametrically opposed grooves leading therefrom for fuel gas.

The respective gases and also cooling water are supplied by a manifold block, and to eliminate the use of tubing, the preheat blocks, nozzle block, and manifold block all have separate passages for the respective gases and cooling water. There are mating faces between the preheat blocks and the nozzle block, and between the nozzle block and the manifold block. These mating faces have registering apertures for the corresponding passages. This construction not only eliminates the undesirable tubing, but also facilitates assembly and service because disconnection of such piping is avoided.

This invention also comprises selective preheat oxygen valving means for each pair of upper and lower preheat blocks for adjusting the effective width of preheat flames to the width of the work; and hollow bolts passing through the nozzle block and screwing into the lower preheat blocks, water being led into the blocks through the hollow interior of the bolts.

Figure 16:
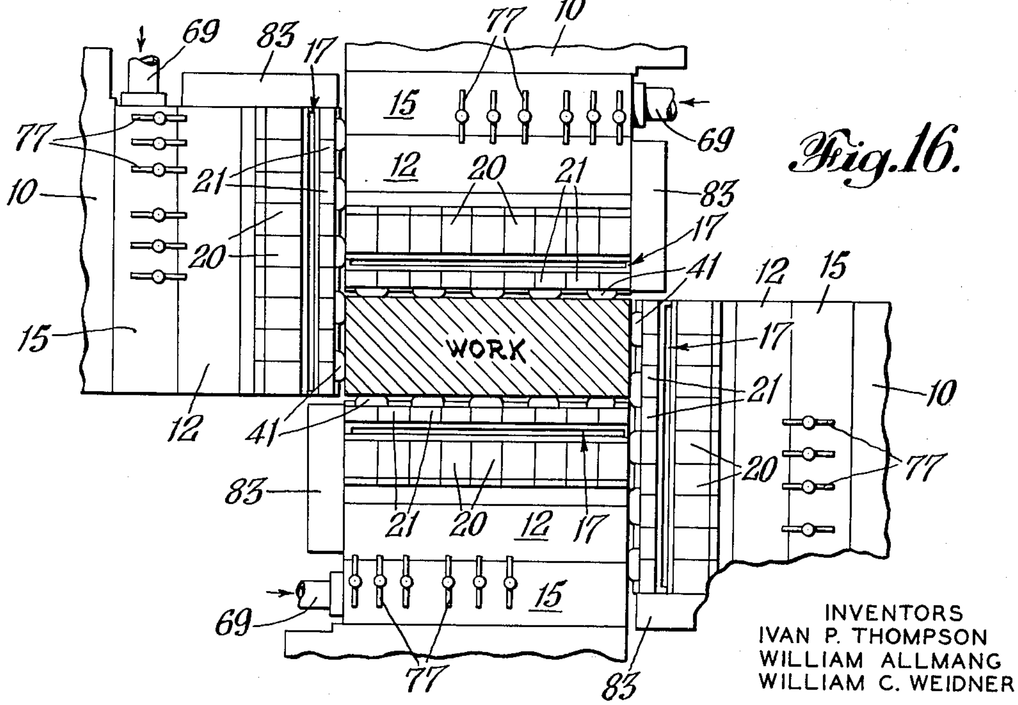
Figure 17:
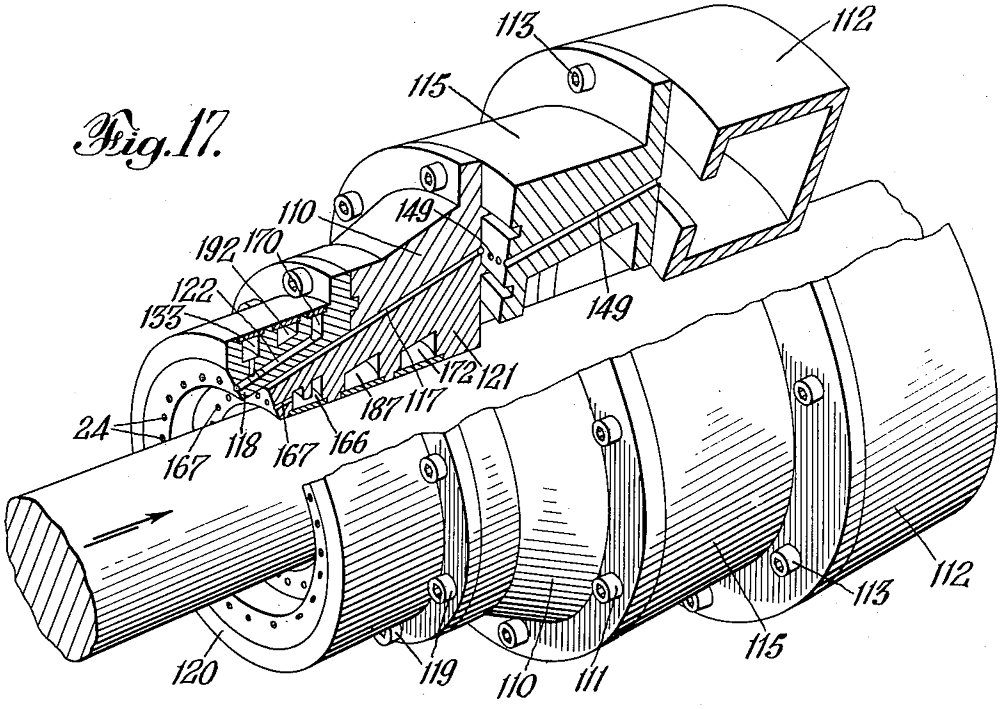
Figure 18:
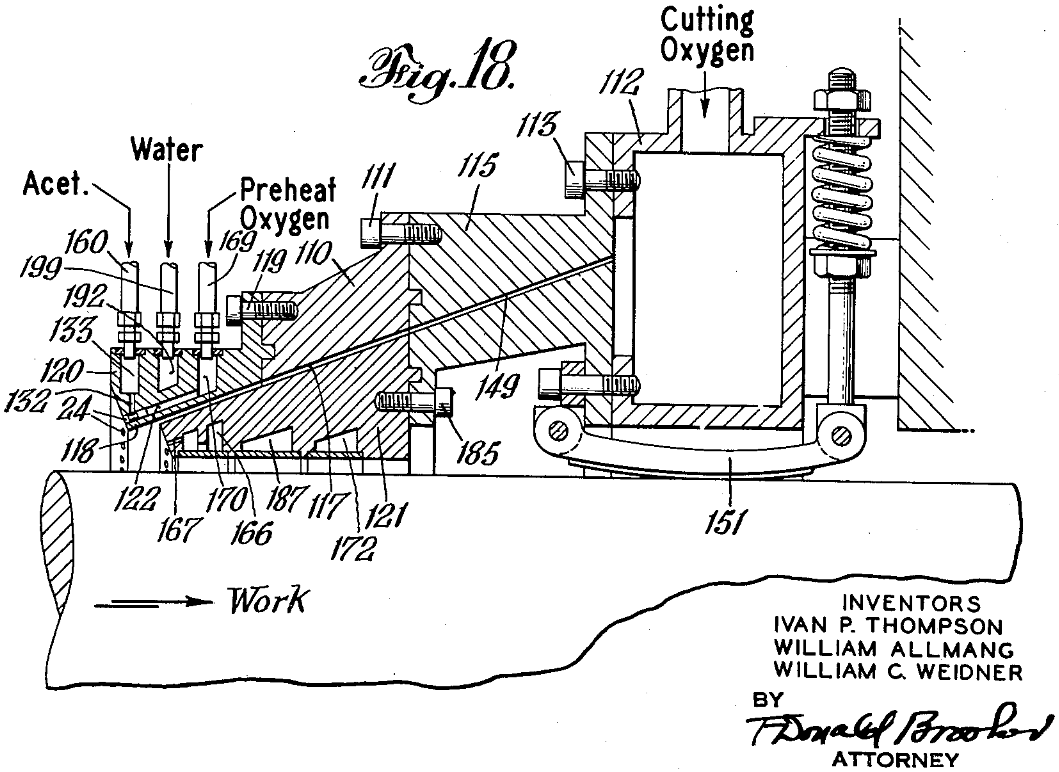
Figure 19:
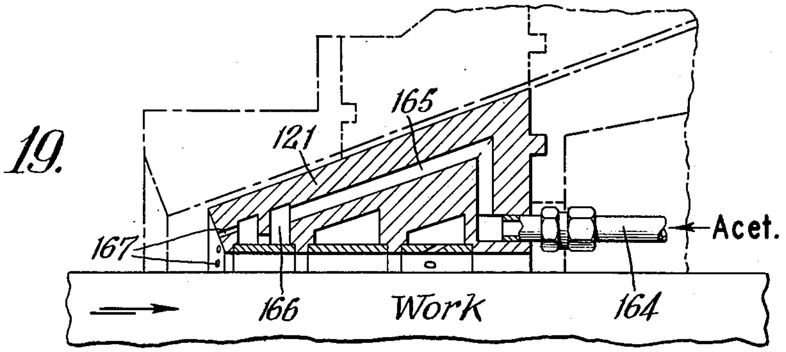
Figure 20:
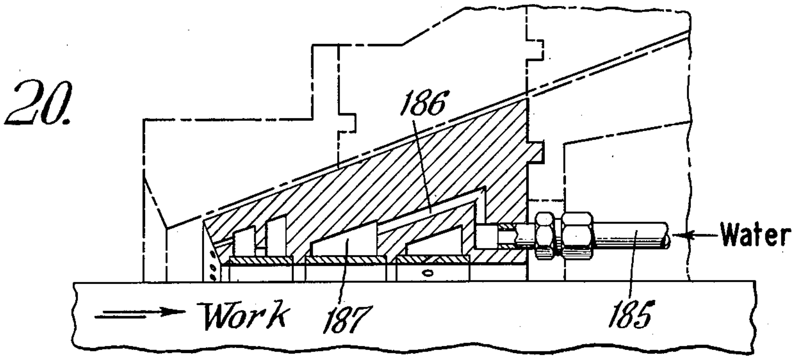

Fig. 16 illustrates the positions of the heads for desurfacing a rectangular workpiece, the upper and lower horizontal heads being shown in their full effective width positions of the scarfing action to the width of the work while the right and left vertical heads are shown in position after having been valved to receive the narrowest desurfacing pass that can be handled by just three upper and three lower preheat blocks in each head;

Fig. 17 is a perspective view partly in section of a modified form of the invention adapted to desurface cylindrical stock;

Fig. 18 is a vertical longitudinal section through the head shown in Fig. 17;

Fig. 19 is a detail section through the preheat ring, showing the fuel gas passages;

Fig. 20 is a similar section showing the cooling fluid passages; and

Figure 21:
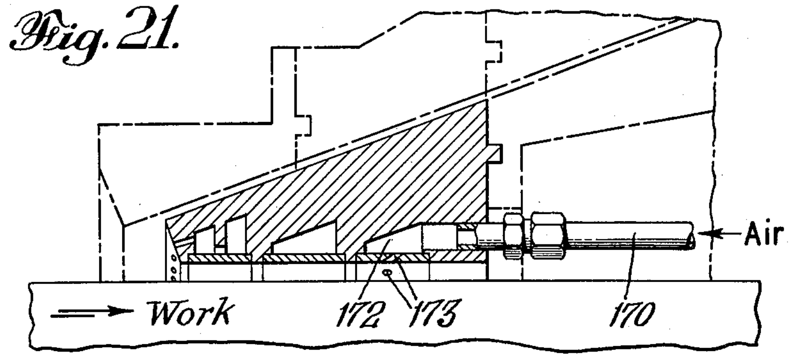

Fig. 21 is a similar section showing the oxidizing gas passages.

Figures 1, 2:
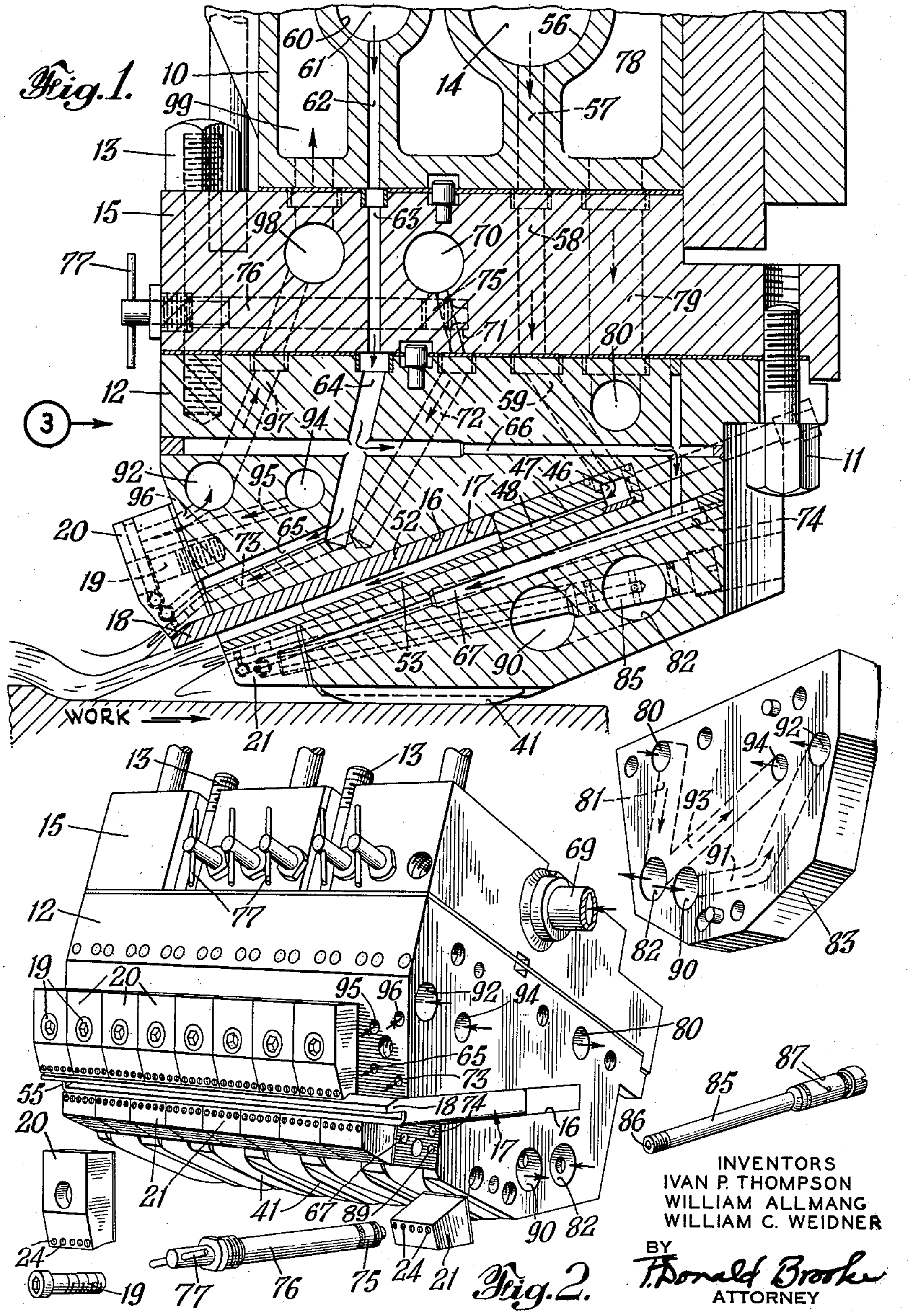
Fig. 1 is a vertical section through a desurfacing head illustrating the invention.
Fig. 2 is a partly exploded view of such desurfacing head.
Figure 3:
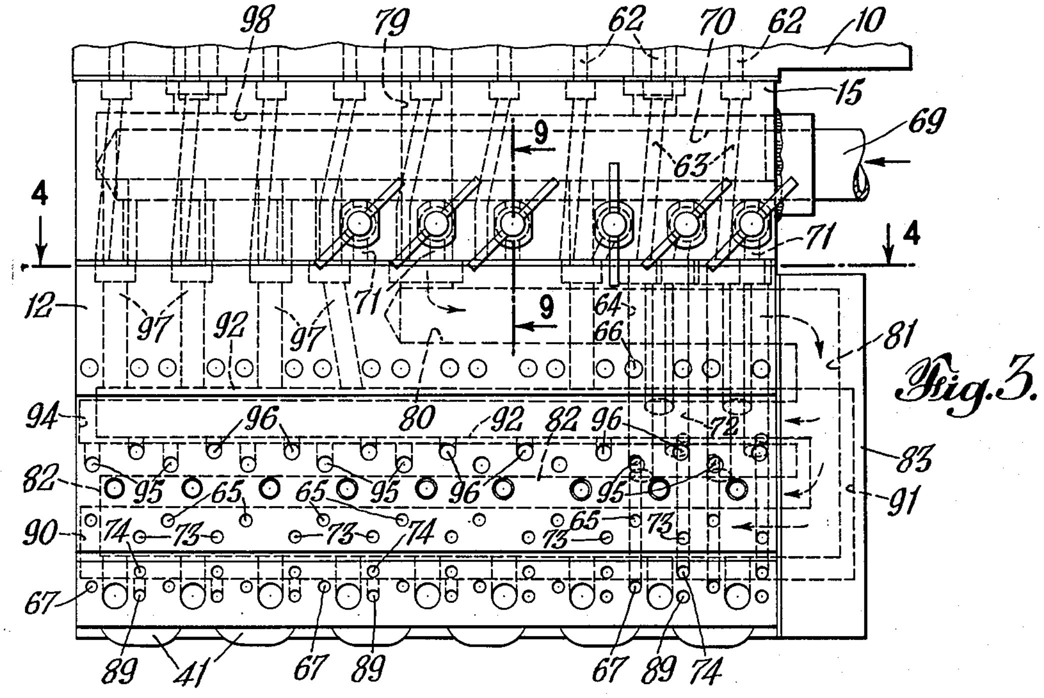
Fig. 3 is a front elevation of the desurfacing head, with parts removed, showing the various gas and water passages.
Figure 4:
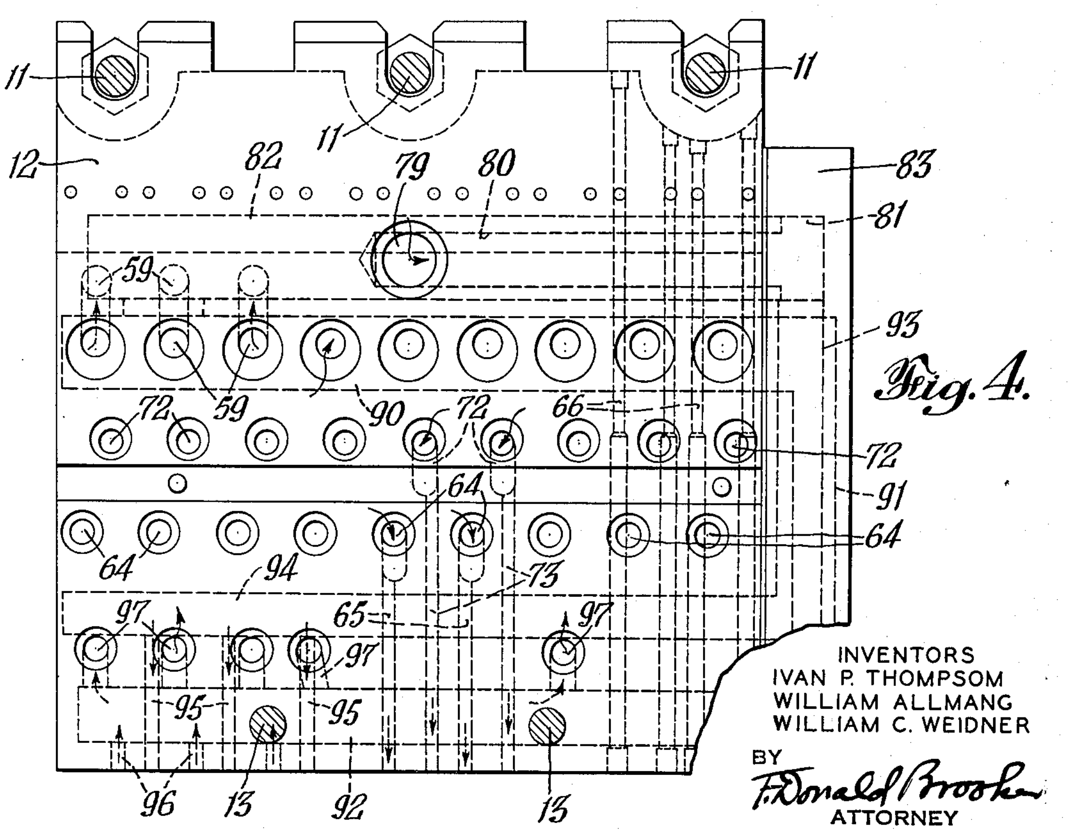
Fig. 4 is a detail plan view of the head, looking in the direction of the arrows along the line 4—4 of Fig. 3, showing the various inlet ports of the gas and water passages shown in Fig. 3.

The desurfacing head best shown in Figs. 1 and 2 comprises a manifold block 10 and a nozzle block 12, of generally plane slotted form. The manifold block comprises a selector valve assembly as disclosed in the copending application of Miller and Kolody, Serial No. 661,171, filed April 10, 1946, now Patent No. 2,524,920 issued October 10, 1950, and an adaptor or spud plate 15. The nozzle block 12 is secured to the spud plate 15 by bolts 11, and the spud plate 15 is secured to the manifold block 10 by bolts 13.

The nozzle block 12 has a deep groove 16 formed therein adapted to receive an insert 17 to form a wide continuous slotted oxidizing gas distributing nozzle. The upper wall of the groove 16 extends beyond and overhangs the lower wall thereof, and the insert has an overhanging upper lip 18.

Figures 5, 8:
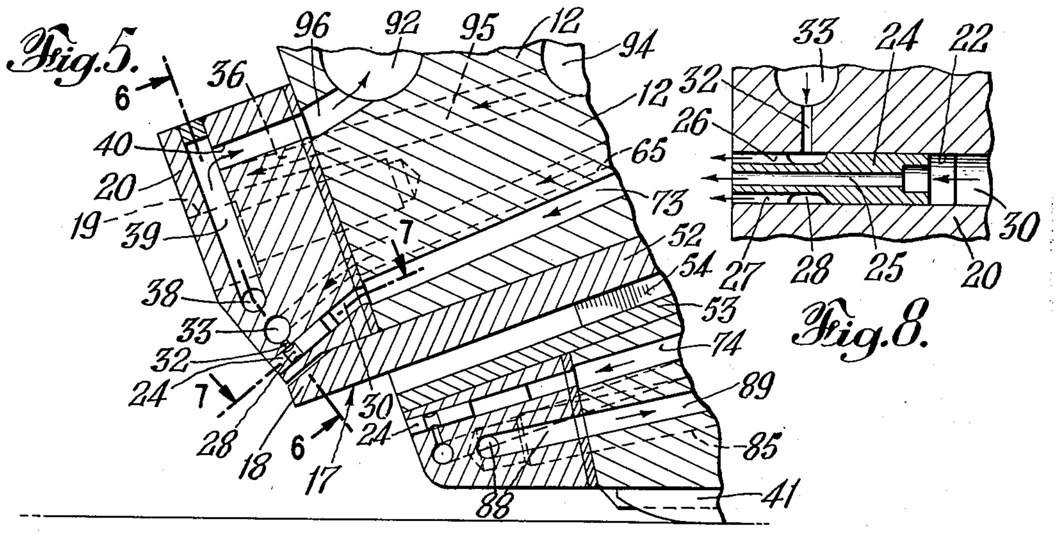
Fig. 5 is an enlarged fragmentary view of the exit or downstream end of the cutting oxygen passage, showing the upper and lower preheat blocks mounted in relation thereto.
Fig. 8 is an enlarged fragmentary detail vertical section through any of the individual preheat tips.
Figures 6, 7:
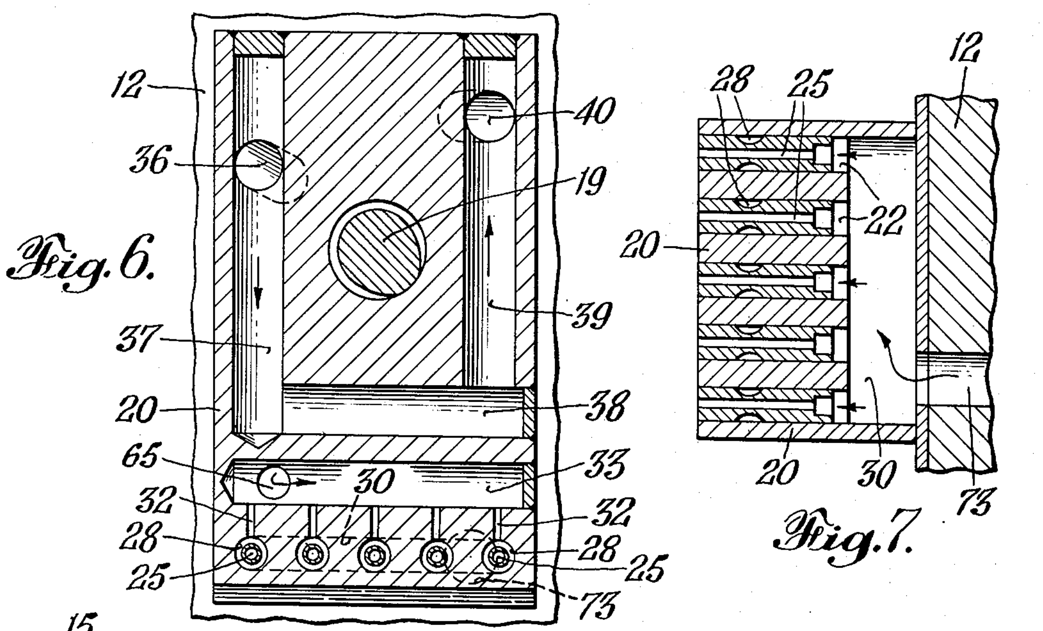
Fig. 6 is an enlarged detail vertical section through the upper preheat block taken along the line 6—6 of Fig. 5.
Fig. 7 is an enlarged detail horizontal section through the preheat tips in the upper preheat block taken along the line 7—7 of Fig. 5.
Figure 9:
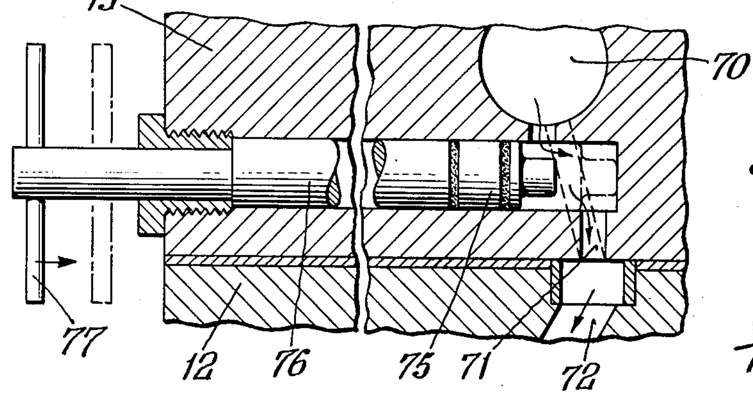
Fig. 9 is an enlarged fragmentary detail vertical section of the quick "on" and "off" valve assembly for the preheat cutting oxygen taken along the line 9—9 of Fig. 3.

Mounted on the front of the nozzle block 12 above the groove 16 is a row of interchangeable and replaceable preheat blocks 20, depending into engagement with the lip 18, and each secured to the nozzle block 12 by a bolt 19. As shown in Figs. 7 and 8, each preheat block 20 has a row of post-mixed preheat burners formed by bores 22 in which are fitted inserts 24. Each insert has a central bore 25 for oxidizing gas, and longitudinal peripheral grooves 26 and 27 for fuel gas, preferably diametrically opposed and connecting with an annular groove 28 in the periphery of the insert 24.

As shown in Fig. 7, the bores 22 all extend into a transverse oxidizing gas passage 30 in each preheat block, which forms a manifold for the central bores 25 in the respective inserts 24. As shown in Fig. 6, the annular grooves 28 are connected by branch passages 32 to a transverse fuel gas passage 33 which forms a manifold for the longitudinal fuel gas grooves 26 and 27. For the circulation of cooling water, each preheat block has a water inlet passage 36 descending bore 37, cross passage 38, riser 39 and outlet passage 40.

Mounted on the set back front face of the nozzle block 12 below the groove 16 is a row of interchangeable and replaceable lower preheat blocks 21, having similar bores, inserts, manifolds and passages for oxidizing gas, fuel gas, and cooling water. The bottom of the nozzle block is provided with wear resisting skids 41.

The short preheat blocks are easily assembled or removed. The cylindrical inserts 24, are readily precision manufactured by automatic screw machines, and when damaged can be easily driven out from the rear and readily replaced.

Figures 10, 11, 12, 13:
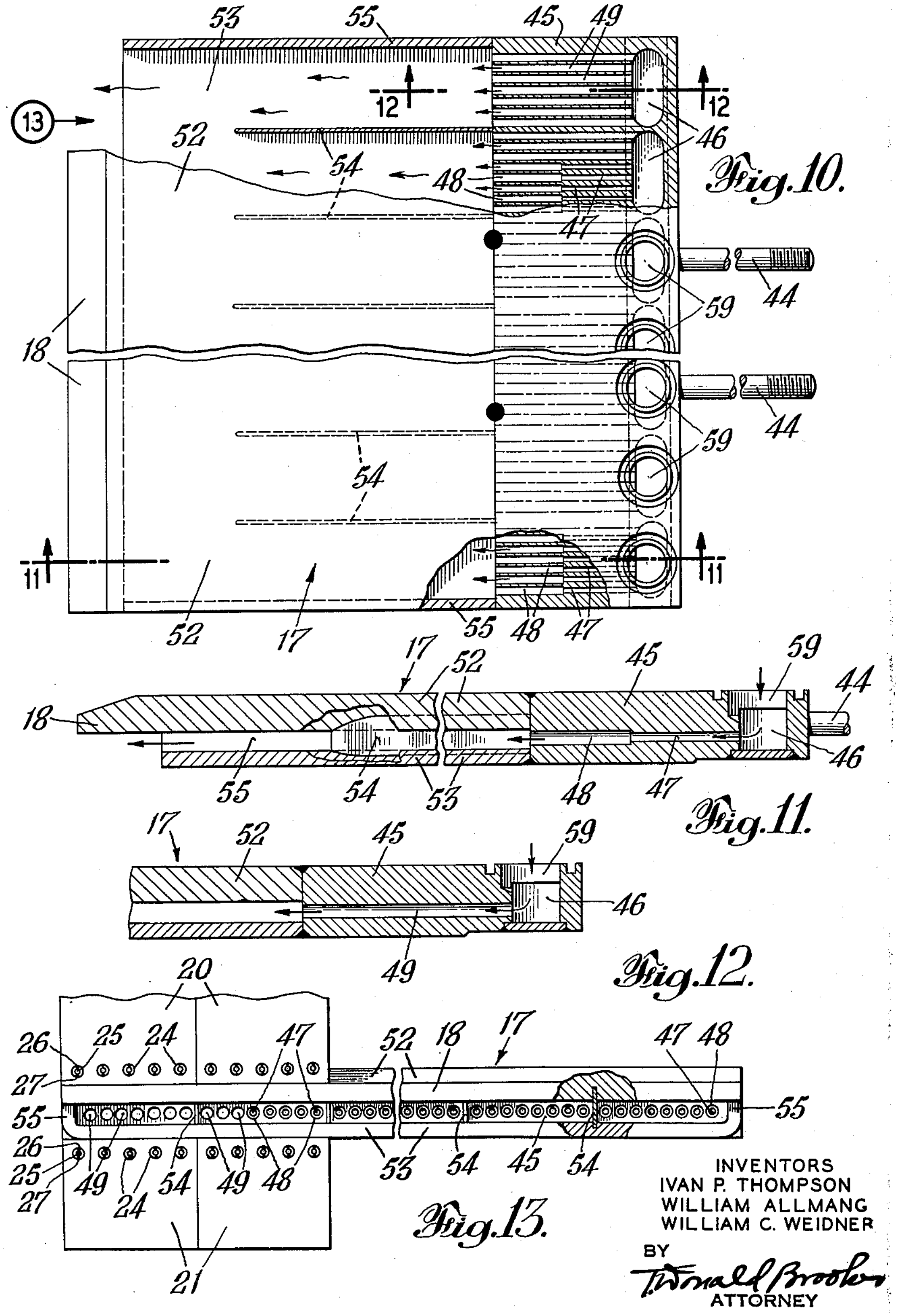
Fig. 10 is a detail plan view with parts broken away and in section of the cutting oxygen insert.
Fig. 11 is an enlarged vertical section through one of the step throat drillings in the cutting oxygen insert taken along the line 11—11 of Fig. 10.
Fig. 12 is a similar section, through one of the straight throat drillings in the cutting oxygen insert, taken along the line 12—12 of Fig. 10.
Fig. 13 is an enlarged detail front view of the gas exit end of the cutting oxygen insert.

The oxidizing gas nozzle insert 17 is held in the deep groove 16 by bolts 44 which extend through the back of the nozzle block 12. As shown in Fig. 10 the insert 17 has a rear section 45 in which are formed a plurality of transversely extending oxidizing gas chambers 46. Intermediate portions of the rear section 45 have a plurality of longitudinal bores 47 of stepped diameters, the smaller diameters extending into the chambers 46. As shown in Fig. 11 the outer ends of these bores are of increased diameter as at 48. As shown in Fig. 12, the rear section containing the outermost chamber 46 has bores 49 of uniform diameter larger than the bores 47 extending into their chamber 46, to provide full flow adequate to handle corner conditions for four sided scarfing.

The remainder of the nozzle is formed by an upper plate 52 and a lower plate 53, held in spaced relation by partitions 54 which extend part way from the rear section 45 toward the mouth of the nozzle. The sides of the insert are closed by side plates 55, preferably turned up flanges of the lower plate 53.

The cutting oxygen insert 17 of stainless steel or other refractory material has great resistance to the heat of the scarfing reaction. The overhanging lip 18 permits satisfactory starts at greater nozzle heights and shallower angles because the upper preheat is located closer to the work. The increased velocity of the fixed end of the cutting oxygen stream through the cutting insert effects increased flow at the corners when four sided scarfing is done using four of these nozzles to provide the same metal removal on the corners as is obtained on the flat surfaces.

Oxidizing gas for the nozzle 17 is supplied from a manifold 56 in the manifold block 10, which manifold may contain a selector valve 14 as described in the aforesaid Miller and Kolody application. The manifold 56 has branch passages 57 registering with branch passages 58 in the spud plate 15, in turn registering with branch passages 59 in the nozzle block 12, which lead to the transverse chambers 46 in the rear of the nozzle insert 17. The manifold block 10 and the spud plate 15 have mating faces, with registering apertures for the corresponding passages therein. The spud plate 15 and the nozzle block 12 also have similarly mating faces and registering apertures.

Fuel gas such as acetylene is supplied by a manifold 60 in the manifold block 10, which also may have a selector valve 61 therein. The manifold 60 has branch passages 62 registering with branch passages 63 in the spud plate 15 in turn registering with branch passages 64 in the nozzle block 12. These branch passages have registering apertures in the mating faces of the manifold block and spud plate, and of the spud plate and the nozzle block, respectively.

The fuel gas passages 64 each have one fork 65 connected to the fuel gas manifold 33 in each upper preheat block through registering apertures in the mating faces of the preheat block and the projecting upper front face of the nozzle block. The other forks 66 of the fuel gas passages extend back, around, and down under the deep groove 16 and nozzle insert 17 to a forwardly extending passage 67 which is connected to the fuel gas manifold of the lower preheat blocks through similarly registering apertures.

The preheat oxidizing gas is supplied by an inlet 69 connected to manifold passage 70 in the spud plate 15. The manifold passage 70 has branch passages 71 registering with branch passages 72 in the nozzle block 12. These branch passages 71 and 72 have registering apertures in the mating faces of the nozzle block 12 and spud plate 15.

The branch passages 72 are forked in the same manner as the fuel gas passages 64, providing upper passages 73 leading to upper preheat block oxidizing gas manifolds 30, and lower passages 74 leading to the corresponding lower preheat block, and through similar registering apertures in the corresponding mating faces of the nozzle block and respective preheat blocks.

The spud plate 15 with its sets of passages, mating faces, and registering apertures, replaces individual gas supply tubes which were subject to rupture under flashback conditions.

For cutting off excess preheat blocks when narrow work is being desurfaced, each branch preheat oxidizing gas passage 71 in the spud plate is provided with a valve 75 seated in the passage and having a stem 76 operated by a handle 77 operable from the front of the spud plate 15.

As shown in Fig. 16, the sides of the workpiece form the narrowest desurfacing pass which can be handled by just three upper and three lower preheat blocks whose preheat oxygen conduits are open through the adaptor plate at all times, while wider passes such as the top and bottom of the workpiece shown require wider preheat patterns and therefore more blocks are made available by opening the valves 75, which control six of the nine preheat block pairs shown.

Cooling fluid is supplied from a chamber 78 in the manifold block 10 through a passage 79 in the spud plate 15 leading to a transverse passage 80 in the nozzle block 12. The passage 80 registers with a passage 81 in the end plate 83 which connects with transverse manifold passage 82 in the bottom of the nozzle block 12.

Figure 14:
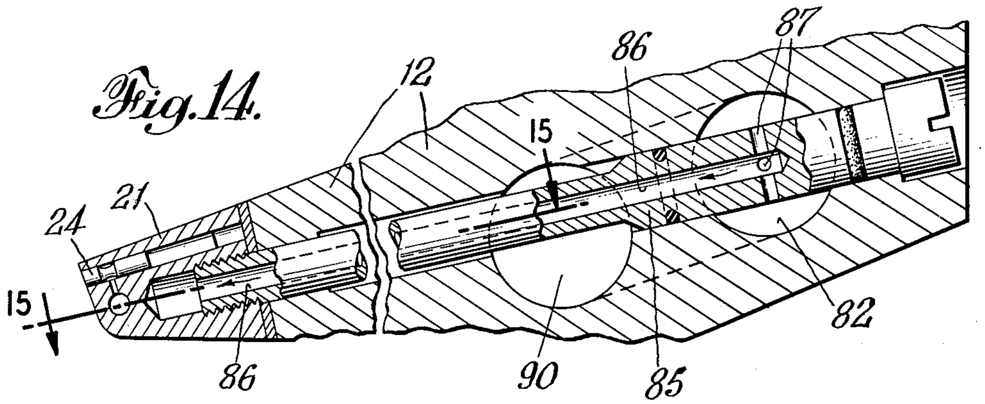
Fig. 14 is an enlarged detail view of the lower preheat block and cooling water screw for holding the block in position.
Figure 15:
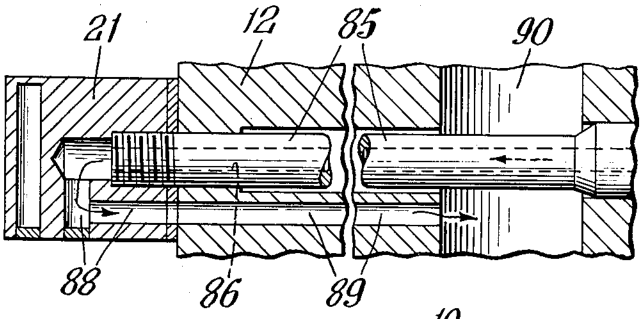
Fig. 15 is a horizontal section taken along the line 15—15 of Fig. 14 showing the path of the cooling water through the lower preheat blocks.

As shown in Fig. 14, the lower preheat blocks 21 are secured to the set back lower front face of the nozzle block by hollow bolts 85. These bolts pass through bores in the nozzle block, and are intersected by lateral bores 87 which open into the water manifold 82. As shown in Fig. 15 the preheat blocks 21 have cross passages 88 connecting the bores 86 to return passages 89 in the nozzle block leading to a transverse return manifold passage 90.

As shown in Fig. 2 the water return manifold 90 is connected by a passage 91 in the end plate 83 to upper return manifold 92. The inlet manifold 82 is connected by a passage 93 to an upper inlet manifold 94 having branch passages 95 connected to the upper preheat block water inlets 36 through registering apertures in the mating faces of the upper preheat block and the upper forwardly extending face of the nozzle block. The outlets 40 are similarly connected to branch passages 96 of the water outlet manifold 92, which has an outlet 97 connected to a passage 98 in the spud plate 15 leading to an outlet manifold 99 in the manifold block 10.

Figs. 17 to 21 inclusive show the invention adapted to the desurfacing of round stock. The cutting oxygen is supplied by a ring 112 which is provided with spring cushioned skid plates 151. Secured to the ring 112 by bolts 113 is an adaptor or spud ring 115, to which a nozzle block of generally conical slotted form comprising a ring 110 is secured by bolts 111. An outer preheat ring 120 is secured to the nozzle ring 110 by bolts 119, and an inner preheat ring 121 is secured to the spud ring 115 by bolts 185.

The spud ring 115 has bores 149 for delivering oxygen to a conical slot 117 between the nozzle ring and the inner preheat block 121, the bores 149 being aligned as elements of the same cone. The outer preheat block 120 extends forwardly, forming an overhanging lip 118.

The outer preheat ring has a series of bores 122 aligned as elements of a cone concentric to the slot 117 each provided with inserts 24 identical with those shown in Figs. 6, 7 and 8. The bores 122 extend into a preheat oxygen manifold ring 170 supplied by an inlet 169. The acetylene grooves of the inserts 24 are supplied by passages 132 leading from a fuel gas manifold ring 133 supplied by an inlet 160. The outer preheat ring has an annular cooling chamber 192 supplied by an inlet 199.

As shown in Fig. 19, the inner preheat block 121 has a conical series of bores 167 leading from a fuel gas manifold ring 166 supplied by passages 165 from an inlet 164. As shown in Fig. 20 an annular cooling chamber 187 is supplied by passages 186 from an inlet 185, and passes out an outlet not shown. As shown in Fig. 21, air is projected through bores 173 from a manifold ring chamber 172 supplied by an inlet 170.

We claim:

1. In apparatus for thermochemically scarfing metal bodies, a surface conditioning head comprising a nozzle block having a wide continuous slot therein adapted to discharge a sheet-like stream of oxidizing gas in a zone extending across a metal body, said slot being adapted to be disposed at an acute angle of impingement to the work surface of said metal body, the lower surface of the upper wall of said slot extending smoothly and continuously forwardly and terminating in a front edge beyond the front edge of the lower wall of said slot in overhanging relation thereto for a distance measured along said slot and greater than the spacing of said walls, to bring the front edge of said upper wall close to the horizontal projection of the front edge of said lower wall.

2. Apparatus as claimed in claim 1, in which said surface conditioning head is provided with a plurality of fuel gas orifices above said front edge of said overhanging upper wall and close to the horizontal projection of the front edge of said lower wall.

3. In apparatus for thermochemically scarfing metal bodies, a surface conditioning head comprising a nozzle block having a wide continuous slot adapted to discharge a sheet-like stream of oxidizing gas in a zone extending across a metal body, a plurality of fuel gas burners in a row parallel to and adjacent said slot, each of said fuel gas burners comprising a recess and an insert fitted in said recess, each of said inserts having a longitudinally extending preheat oxidizing gas passage and each insert having a separate longitudinally extending preheat fuel gas passage spaced from said oxidizing gas passage in the same insert and adapted to form a post-mixed preheat flame.

4. In apparatus for thermochemically scarfing metal bodies, a surface conditioning head comprising a nozzle block having a wide continuous slot therein adapted to discharge a sheet-like stream of oxidizing gas in a zone extending across a metal body, said head having at the rear thereof a transversely extending oxidizing gas distributing chamber, said head also having a row of longitudinally extending parallel passages extending from said chamber with increasing cross section to the rear end of said slot, to provide uniform flow out through said wide continuous slot.

5. In apparatus for thermochemically scarfing metal bodies, a surface conditioning head comprising a nozzle block having a wide continuous slot therein adapted to discharge a sheet-like stream onto a zone extending across a metal body, the rear of said head having a row of longitudinally extending parallel passages transversely spaced along the rear of said slot for distributing oxidizing gas thereto, said row comprising passages of the same cross section communicating at regular intervals with the major portion of said slot and other passages communicating with the remaining portion of said slot near one lateral edge of said head, said other passages near the lateral edge of said head being of greater cross section than said passages communicating with the major portion of said slot to provide greater velocity of oxidizing gas at the side than at the center of the resultant flat oxygen stream.

6. In apparatus for thermochemically scarfing metal bodies, a surface conditioning head comprising a nozzle block having a wide continuous slot therein adapted to discharge a sheet-like stream onto a zone extending across a metal body, a row of identical interchangeable preheat blocks secured to the front of said nozzle block adjacent the mouth of said slot, said nozzle block and said preheat blocks having mating faces, each of said preheat blocks having a row of preheat fuel gas orifices and passages leading thereto from respective apertures in its mating face, said nozzle block having preheat fuel gas supply passages leading to respective apertures in its mating face registering with those in the mating face of said preheat block and means for supplying preheat oxidizing gas separate from said fuel gas apertures to form post-mixed preheat flames.

7. In apparatus for thermochemically scarfing metal bodies, a surface conditioning head comprising a nozzle block having a deep groove therein, a preheat block secured to the front of said block below the mouth of said groove, cooling fluid passages in said blocks, and a hollow bolt securing said preheat block to said nozzle block and formed with passage means establishing communication between said cooling fluid passages.

8. In apparatus for thermochemically scarfing metal bodies, a surface conditioning head comprising a nozzle block and a manifold block having superimposed flat, substantially horizontal mating faces secured together, said nozzle block having a wide continuous slot therein forming an orifice adapted to discharge a sheet-like stream of oxidizing gas in a zone extending across a metal body, and a row of orifices above and parallel and closely adjacent to the upper edge of said slot for discharging jets of preheat fuel gas, and passages extending from respective apertures in its mating face to said orifices for supplying said gas thereto, said manifold block having passages for said gas extending to corresponding apertures in its mating face registering with those in the mating face of said nozzle block and means for supplying preheat oxidizing gas separate from said fuel gas apertures to form post-mixed preheat flames.

9. In apparatus for thermochemically scarfing metal bodies, a surface conditioning head comprising a nozzle block and a manifold block having mating faces secured together, said nozzle block having a wide continuous discharge slot for oxidizing gas, a row of fuel gas orifices parallel to and adjacent said slot, and means for supplying preheat oxidizing gas separate from said fuel gas orifices, said nozzle block having an oxidizing gas passage for supplying said slot and separate fuel gas passages for supplying said row of orifices all extending to respective apertures in its mating face, and said manifold block having oxidizing gas and preheat fuel gas manifolds each comprising a main common supply passage with smaller passages branching off therefrom at spaced intervals therealong extending to respective apertures in its mating face registering with corresponding apertures in the mating face of said nozzle block.

10. In apparatus for thermochemically scarfing round metal bodies, a surface conditioning head comprising a nozzle ring having a conical slot therein adapted to discharge a conical stream of oxidizing gas in a zone extending around said body, a plurality of preheat fuel gas orifices in a ring concentric to said slot, and preheat oxidizing gas orifice means separate from said fuel gas orifices and in a ring concentric therewith to discharge preheat oxidizing gas separate from the jets of fuel gas to form post-mixed preheat flames.

11. Apparatus as claimed in claim 10 in which the outer wall of said conical slot overhangs the inner wall thereof, said ring of preheat orifices are outside of said overhanging wall, and another ring of preheat orifices are inside of and to the rear of said first ring of preheat orifices.

12. In apparatus for thermochemically scarfing metal bodies, a surface conditioning head comprising a nozzle block having a laterally continuous slot therein adapted to discharge a sheet-like stream of oxidizing gas in a zone extending transversely to the surface of a metal body, said slot being adapted to be disposed at an acute angle to the work surface of said metal body, the wall of said slot farther from said work surface extending smoothly and continuously forwardly and terminating in a front edge beyond the front edge of the wall of said slot nearer to said work surface for a distance measured along said slot and greater than the spacing between said walls to bring the front edge of said farther wall close to the horizontal projection of said nearer wall a plurality of fuel gas orifices equidistant from said slot and in line adjacent thereto, and means for supplying preheat oxidizing gas separate from said fuel gas orifices and equidistant from said fuel gas orifices and equidistant from said slot in a line adjacent to said line of fuel gas orifices to discharge preheat oxidizing gas separate from the jets of fuel gas from said fuel gas orifices to form post mixed preheat flames.

13. In a scarfing blowpipe head, the combination of a cutting oxygen nozzle having a flat parallelopiped passage, partitions dividing said passage into a series of parallel cutting oxygen ways, said partitions terminating within such passage upstream with respect to the discharge end of said nozzle so as to form a common outlet for the cutting oxygen flowing through said ways, an oxygen supply chamber for each of said ways at the inlet end of said nozzle, a single oxygen supply inlet for each of said chambers, and means providing a battery of cutting oxygen supply passages supplying each of such ways from its chamber, whereby a ribbon-like stream of cutting oxygen is discharged from said common outlet.

14. Apparatus as claimed in claim 10 for scarfing the entire substantially cylindrical periphery of a substantially cylindrical cross section in a single longitudinal pass, said head being hollow and shaped to accommodate the passage therethrough of said round body of metal, said conical slot being endless, narrow and annularly uninterrupted and of substantially uniform width and converging toward the oncoming work and coaxial therewith.

15. Apparatus as claimed in claim 10 for the ridgeless thermochemical scarfing of the entire substantially cylindrical peripheries of said round metal bodies in a single longitudinal pass through the center of the head, said head comprising the combination of two hollow frusto-conical members converging toward the outlet of the nozzle and coaxial with the substantially cylindrical periphery of the work, one of which is nested inside of the other in spaced relationship, so that the space therebetween forms a frusto-conical passage for cutting oxygen and their rims form an endless narrow annularly uninterrupted slotted orifice, at least the outer one of said members forming a preheat gas burner, and means including an annular closure fitting the large ends of said members for feeding cutting oxygen to the large end of said passage.

16. Apparatus as claimed in claim 10 in which said head is hollow to accommodate said round metal bodies having a substantially cylindrical periphery, said slot having an annularly continuous endless narrow annularly uninterrupted cutting oxygen discharge orifice of uniform width converging toward the nozzle outlet and coaxial with the substantially cylindrical periphery of the work, and burner means concentric with said orifice in which said fuel gas orifices are formed.

References Cited in the file of this patent

UNITED STATES PATENTS

| | | |
|---|---|---|
| 2,267,405 | Jones | Dec. 23, 1941 |
| 2,290,295 | Scheller | July 21, 1942 |
| 2,367,316 | Skinner | Jan. 16, 1945 |
| 2,398,884 | Crowe | Apr. 23, 1946 |
| 2,407,972 | Aitchison | Sept. 24, 1946 |
| 2,483,479 | Smith | Oct. 4, 1949 |
| 2,501,724 | Hughey | Mar. 28, 1950 |
| 2,532,103 | Kiernan | Nov. 28, 1950 |